A. E. LAWRENCE.
STORAGE BATTERY.
APPLICATION FILED JAN. 10, 1911.
995,162.
Patented June 13, 1911.
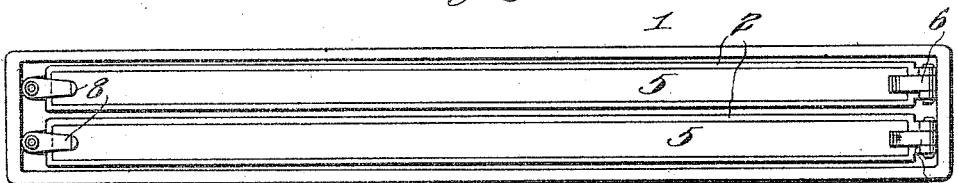
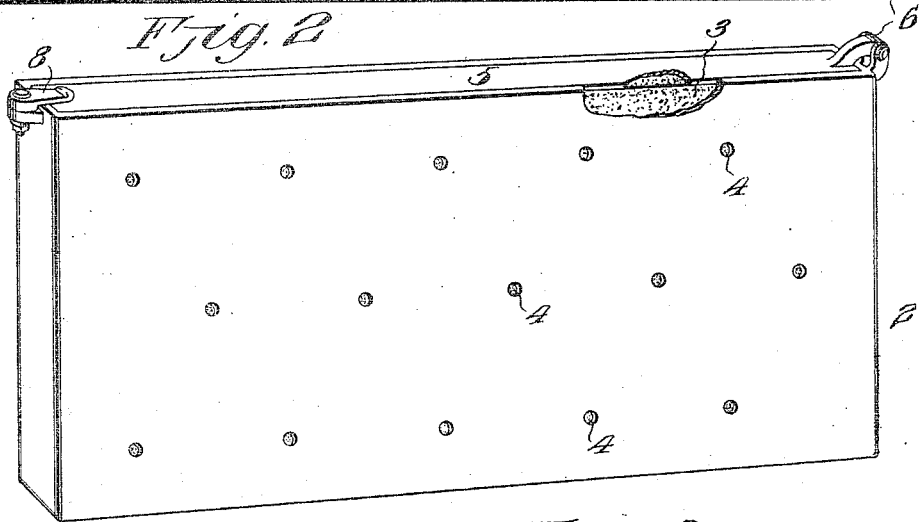
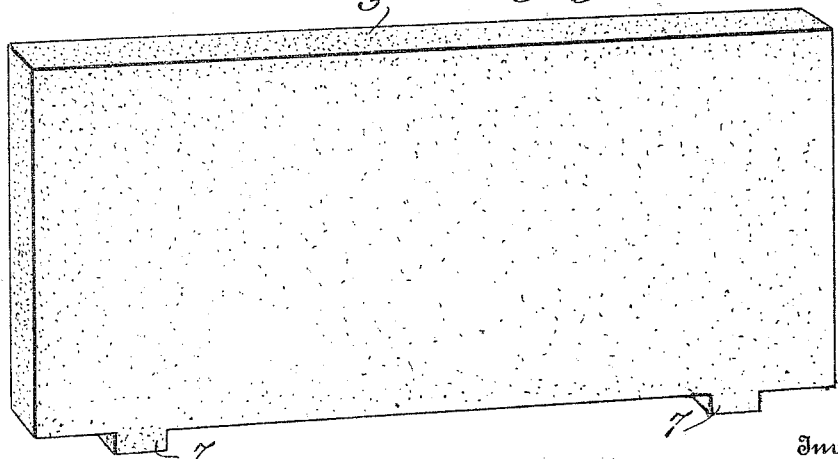
Witnesses
Frank Hough
Inventor
Arthur E. Lawrence,
By Victor J. Evans
Attorney

UNITED STATES PATENT OFFICE.

ARTHUR EWIN LAWRENCE, OF SAN MARCOS, TEXAS.

STORAGE BATTERY.

995,162.

Specification of Letters Patent.   Patented June 13, 1911.

Application filed January 10, 1911.   Serial No. 601,854.

*To all whom it may concern:*

Be it known that I, ARTHUR E. LAWRENCE, a citizen of the United States, residing at San Marcos, in the county of Hays and State of Texas, have invented new and useful Improvements in Storage Batteries, of which the following is a specification.

This invention relates to storage batteries or accumulators and the object of the invention is the provision of a simply and cheaply constructed battery of this type which will give a comparatively high amperage for the size and number of plates used.

A further object of the invention is to provide a novel plate for storage batteries and a novel container for the same.

Further objects of the invention will appear as the following specific description is read in connection with the accompanying drawing which forms a part of this application, and in which:

Figure 1 is a top plan view. Fig. 2 is a perspective view of one of the plate cases. Fig. 3 is a perspective view of one of the plates.

Referring more particularly to the drawing 1 represents the plate cell and 2 the plate cases which are mounted therein and which hold the plates 3. The cell comprises the usual glass receptacle in which the exciting liquid is held, and the cases 2 comprise a metallic receptacle having a plurality of holes 4 through which the exciting liquid is adapted to pass, and a top 5 hinged to one end of the case by a knuckle joint 6. The top is somewhat smaller than the interior diameter of the case and therefore seats inside the same on top of the plate 3. The case and top are preferably constructed of lead and only of a sufficient width to permit the insertion of the active material of which the plate is formed.

The positive plates are composed of one part of graphite and nine parts of litharge, while the negative plates are composed of nine parts of red lead and one part of graphite. These constituents are compounded preferably by weight. These plates are each pressed into form and are inclosed in the lead cases with suitable projections 7 on their under surfaces to support them above the bottom of said cases and thereby permit a quantity of the exciting fluid to gain access to the plates. The tops 5 are secured down upon the plates by clamps 8 and the terminals of these plates may be secured thereto in any suitable manner.

Having thus described the invention, what is claimed is—

1. An accumulator plate composed of one part of graphite and nine parts of red lead and having a metallic covering.

2. A storage battery comprising a plurality of negative and positive plates, the negative plates being composed of one part of graphite and nine parts of red lead and the positive plates being composed of one part of graphite and nine parts of litharge, and an apertured metallic covering for said plates.

3. An active plate for storage batteries comprising a pressed body of active material, a metallic casing for said body, and projections on said body for supporting said plate above the bottom of the casing.

In testimony whereof I affix my signature in presence of two witnesses.

ARTHUR EWIN LAWRENCE.

Witnesses:
  CLINTON RANDLES,
  FRANK RANDLES.